Mar. 27, 1923.

J. A. OBERMAIER.
FLOW METER.
FILED JAN. 2, 1918.

1,449,437.

Inventor
John A. Obermaier
By Brown, Hanson & Potter
Attorneys

Mar. 27, 1923.

J. A. OBERMAIER.
FLOW METER.
FILED JAN. 2, 1918.

Inventor
John A. Obermaier
By Brown Jackson & Boettcher
Attorneys

Mar. 27, 1923.
J. A. OBERMAIER.
FLOW METER.
FILED JAN. 2, 1918.
1,449,437.
5 SHEETS—SHEET 3.

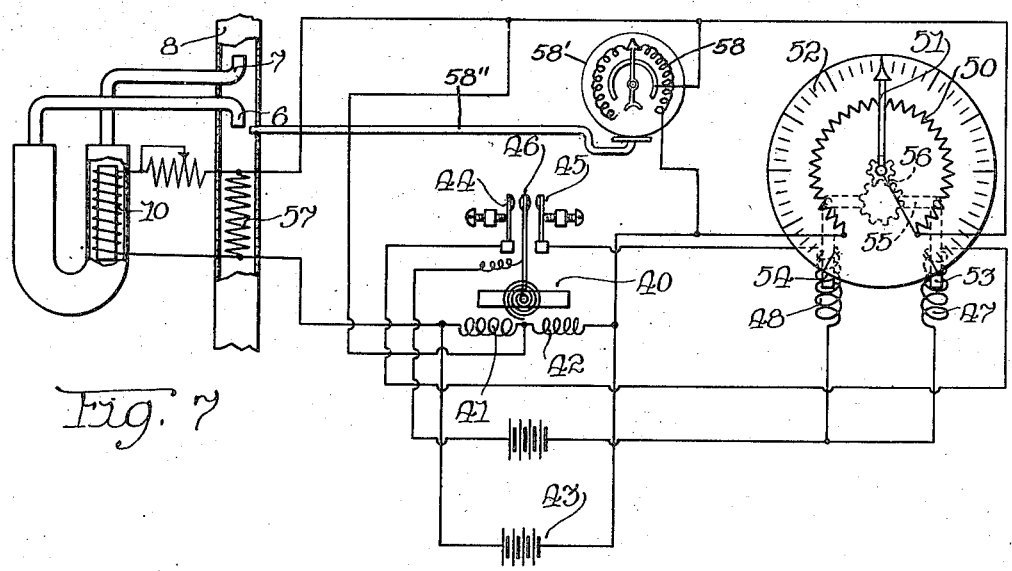
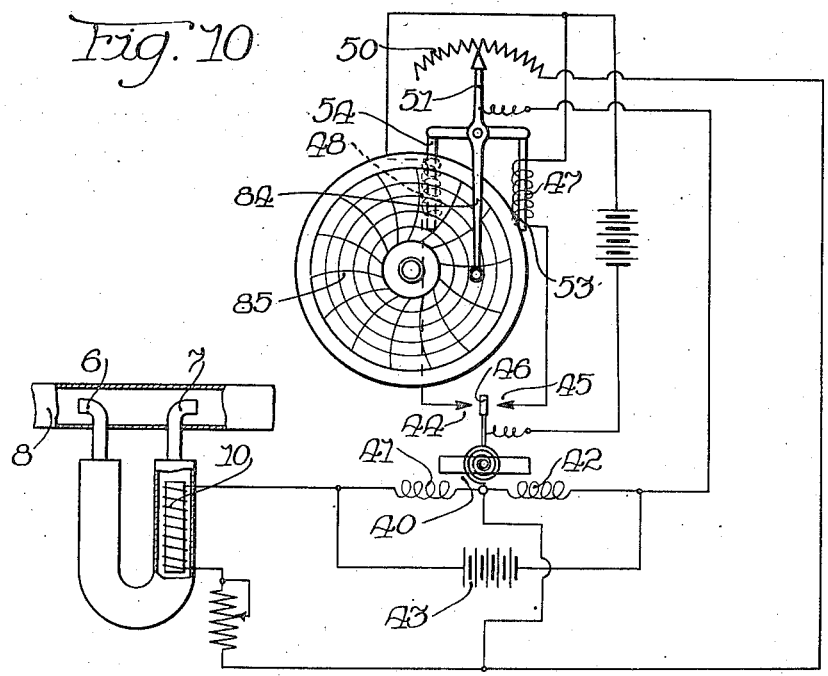

Mar. 27, 1923.

J. A. OBERMAIER.
FLOW METER.
FILED JAN. 2, 1918.

Inventor
John A. Obermaier
By Brown Hanson & Boettcher
Attorneys

Patented Mar. 27, 1923.

1,449,437

UNITED STATES PATENT OFFICE.

JOHN A. OBERMAIER, OF CHICAGO, ILLINOIS.

FLOW METER.

Application filed January 2, 1918. Serial No. 209,839.

*To all whom it may concern:*

Be it known that I, JOHN A. OBERMAIER, a citizen of the United States, residing at Chicago, in the county of Cook and State of Illinois, have invented a certain new and useful Improvement in Flow Meters, of which the following is a full, clear, concise, and exact description, reference being had to the accompanying drawings, forming a part of this specification.

My invention relates to flow meters.

It is often desirable to measure the flow of fluids in a pipe or conduit. This has been found to be, in general, a very difficult matter. In the case of water and gas flowing in small quantities, as is customary with city distribution, it is common practice, at present, to employ a bellows or piston type of meter which mechanically measures the amount flowing.

For measuring the flow of fluids in large quantities, recourse has been had to the Venturi meter (see Church on Hydraulics, p. 725).

In this type of meter the velocity is measured by observing the drop of pressure at the throat of the restriction from that at the mouth of the restriction by means of piezometer tubes.

Where the velocity of flow is great recourse can be had to measurements of velocity by the insertion of a Pitot tube in the pipe or conduit. A pair of these tubes constituting a unit is placed in the pipe or conduit so that the pressure in one is increased by the velocity of flow and the pressure in the other is decreased. These tubes are then generally connected to act upon the two legs of a column of mercury for measuring the difference in pressure. This Pitot tube may be employed in connection with a venturi restriction, or may be placed anywhere in the conduit.

The static pressure must then be measured and indicated in order to provide a suitable meter.

I employ a unit comprising two tubes, one facing counter to the current of fluid to be measured, and the other facing in the direction of flow. These Pitot tubes are connected to a closed vessel which comprises substantially a U-shaped column of liquid, one leg thereof being subjected to the positive pressure caused by the Pitot tube facing counter to the flow of fluid, the other leg being subjected to the negative pressure caused by the Pitot tube facing in the direction of the flow of the fluid. The difference in pressure represents the measure of flow.

I provide in one leg of the liquid column improved means for measuring the variations of level, which variations are caused by the flow of the fluid to be measured.

The means which I employ for measuring the variations in level comprises a conducting liquid forming the U-shaped column and a resistance wire or other suitable conductor inclined to the normal surface of the liquid and adapted to be short circuited as the fluid column rises in one leg of the U.

According to my invention a difference in pressure caused in the Pitot tubes by the flow operates upon a column of conducting liquid to change the height in one or both legs of a U-tube or its equivalent. I insert in one or both legs of the U-tube a resistance element arranged in such manner that a rise in level of conducting liquid short-circuits this resistance element in proportion to the variations.

My idea is to measure the resistance of a circuit by the means herein described rather than to measure the current strength as is done by devices of the prior art. Thus I obtain means for measuring the height of a conducting liquid which in turn is a measure of the flow when used in connection with a Pitot tube or the like.

Since my invention relates to the measurement of the resistance of the circuit enclosed in the U-tube by the means herein described, the indications which I secure are very accurate, as the means for measuring the resistance of conductors employed in this connection are known to be highly reliable and accurate.

Since I measure resistance by the method herein described, constant potential current is not needed, whereas, in the method employed for measuring the flow by the current strength, as heretofore practiced in the art, constant potential is absolutely necessary for accurate results.

As heretofore constructed, flow meters have employed a resistance element upon which a constant potential is to be impressed and the consequent flow of current becomes the measure of the flow measured by the meter.

As distinguished from measuring the current flowing through the variable resistance, my invention provides means for measuring the changes in resistance. As the resistance is a physical characteristic and is independent of potential, accurate measurements are possible under conditions where measurement of current flow would be valueless.

In the prior art devices a watt hour meter is employed to indicate the current flow representing the flow of fluid to be measured. Variations in the impressed potential cause large errors in the device because current varies with the potential and wattage varies with the square of the potential. This causes unduly large errors unless the potential is kept absolutely constant. It is often impossible and generally impracticable to secure a source of constant potential current. According to my invention I provide means for measuring the changes in resistance by balancing the effect of the main resistance to be measured by means of another resistance external to the level controlled resistance.

By this provision I eliminate the effect of variations which might otherwise be caused by change of potential of the source of current.

My invention further provides automatic means for varying the external resistance to secure automatic reading and recording of the device.

In order to integrate the flow per unit of time, I further provide integrating means, either electrical or mechanical, or a combination of both, for giving a reading of total flow over any desired period of time.

Where the fluid to be measured has variations of another characteristic which affect the value or purpose of the fluid flowing, such as the temperature or pressure of steam in a pipe, I provide a corrective resistance which varies in proportion to this quality which it is desired to take into account and thus other valuable information may be recorded at the same time. Thus, for instance, where it is desired to measure the rate of flow of steam and the pressure at which it is delivered, the device of my invention provides means not only for taking into account the variations in flow but also the variations in pressure which may exist.

Other purposes and uses are disclosed more specifically and in detail in the following specification which discloses a number of forms which I have developed.

In the accompanying drawings which form a part of the present specification I have illustrated a number of embodiments for measuring certain of the variables which it is desired to take into account, together with the flow in the pipe or conduit conveying the fluid to be measured.

Figure 7 is a diagram of an embodiment employing a primary resistance and an external resistance with automatic means for maintaining the external resistance at the proper value to balance the primary resistance;

Figure 10 is a diagram of a system employing a recording meter.

Figure 1:
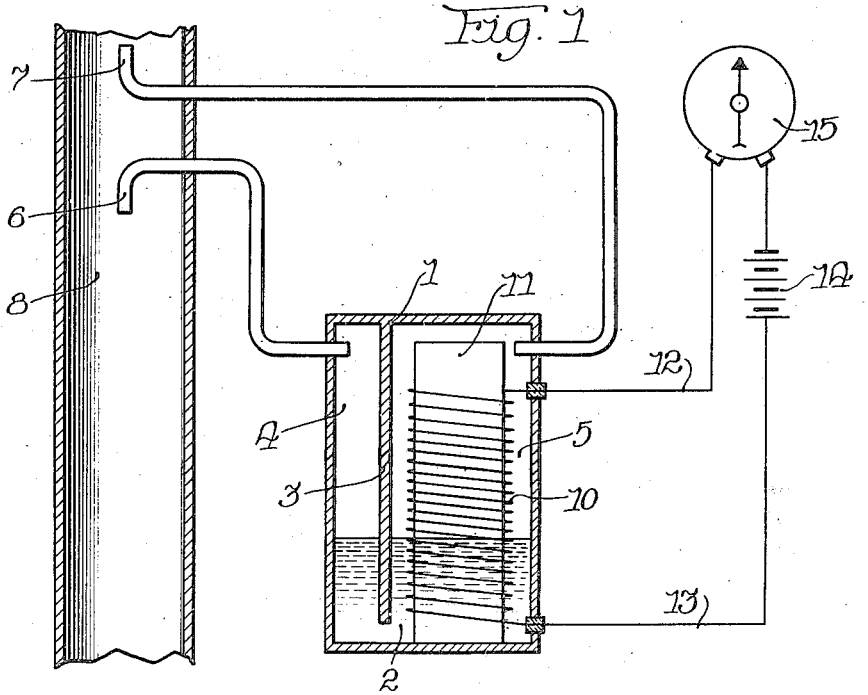
Figure 1 is a diagram of a simple form of my invention showing the improved resistance element which is adapted to be partially short-circuited by the varying column of mercury.

My invention provides a closed pressure chamber 1 containing a U-shaped column of conducting liquid 2 which preferably is mercury. The container 1 comprises a closed vessel having a transverse partition 3 extending down to the lower part of the vessel and dividing the two legs of the U-shaped column of mercury 2. This arrangement provides the two chambers 4 and 5 which are connected to the Pitot tubes 6 and 7, respectively. The Pitot tubes 6 and 7 have ends which face respectively counter to the flow and with the flow of the fluid so as to secure the effect of an increase of pressure in the chamber 4 and a decrease of pressure in the chamber 5. The static pressure of the fluid in the pipe 8 is transmitted equally to the tubes 6 and 7 and thus balances its effect upon the chambers 4 and 5. The chamber 5 contains a resistance wire 10 which is wound in the form of a helix upon a central core 11 which core is made of insulating material. The circuit arrangement that I have shown is of the prior art and is shown to indicate that the resistance element of my invention may be used in any situation. The terminals of the resistance wire 10 are connected by wires 12 and 13 to a source of current 14 and a current measuring instrument 15. Assuming that the potential of the source 14 is constant, and this it rarely is over any period of time, the resistance of the wire 10 can readily be computed by Ohm's law. The instrument 15, which is in fact an ammeter, may be calibrated directly in units of flow of fluid in the pipe 8.

It is apparent that by winding the wire 10 in the form of a helix the amount of wire which is covered or uncovered by a rise or fall of the level of the mercury in the chamber 5 is greatly increased. The greater the diameter of the helix and the finer the pitch of the same, the greater will be the effect of a rise and fall of the column of mercury in varying the resistance.

Figure 2:
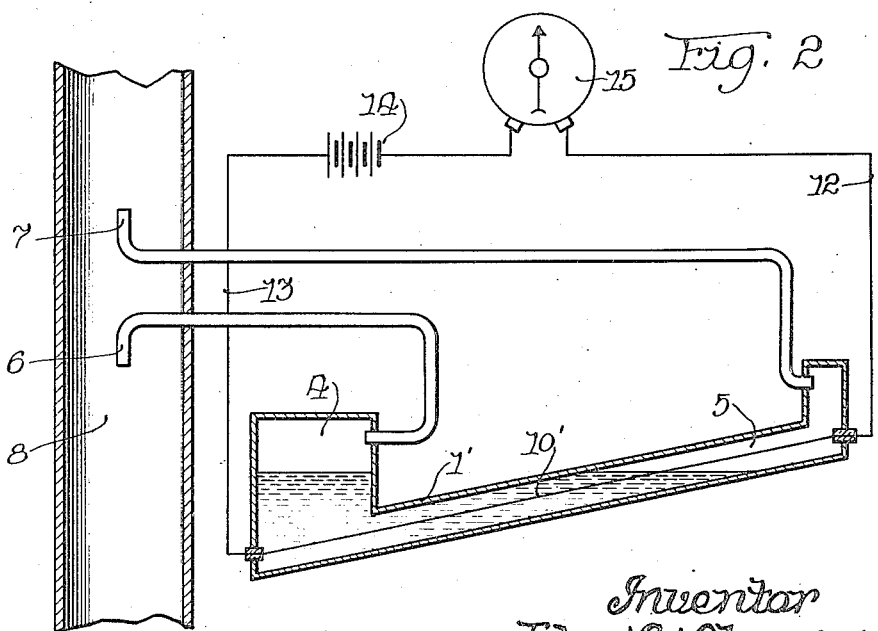
Figure 2 is a similar diagram of a form of the invention.

In Figure 2, I have shown a special form of pressure chamber 1' which comprises the compartments 4 and 5, the compartment 5 being in the form of an inclined tube in which the resistance 10' is mounted. By this arrangement, a relatively small change in level produces a relatively great effect in changing the resistance of the wire 10'.

I have shown the indicator 15 as being employed for measuring the variations in resistance of the wire 10' in the same manner as indicated in Figure 1.

It is apparent that measurement of the changes in level by measuring the variations in current strength is a very unsatisfactory way of securing a proper reading. Not only is the characteristic of such a system for measuring current unsuited to variations over any considerable range, but it is also a fact that any variation of potential in the source of current introduces a large error. I have therefore devised means for securing a proper indication of the flow by measuring the variations of primary resistance through the medium of an external or balancing resistance. This external or balancing resistance may be employed as shown in Figures 3, 4, 5 and 6 with a double coil galvanometer of the balanced type or may be employed in the Wheatstone bridge, which is merely another embodiment of the same idea.

The fundamental novelty of my invention is the measurement of change in resistance caused by change in level rather than the measurement of current caused by said change in resistance.

Figure 3:
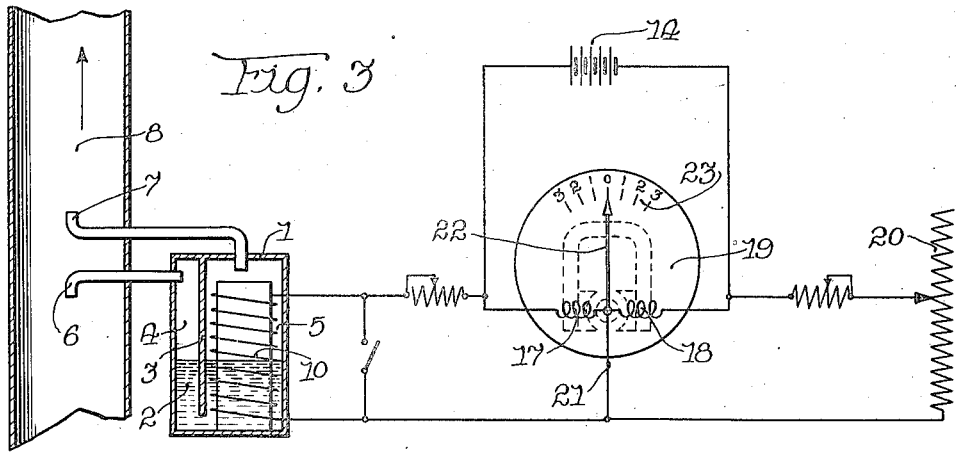
Figure 3 is a diagram illustrating the use of an external resistance and a differential voltmeter indicator.

In Figure 3 the resistance 10 is connected in shunt with the winding 17 of the galvanometer 19. The external or balancing resistance 20 is connected in a similar manner across the winding 18 of the galvanometer 19.

The value of the external resistance 20 may be adjusted to give a zero reading upon the galvanometer 19 when no flow of fluid in the pipe 8 occurs. The source of current 14 is connected directly to the outer terminals of the coils 17 and 18, the primary resistance 10 and the balancing resistance 20 being connected respectively in parallel with the coils 17 and 18 by means of the central tap 21 connecting the extremities of the resistances 10 and 20 with the junction point of the windings 17 and 18.

Assuming that the balancing resistance 20 has been set to equal that of the resistance 10 when no flow occurs in the pipe or conduit 8, when a change of level of the mercury column 2 occurs, due to flow in the pipe 8, reduction of the resistance 10 serves as a shunt of greater effectiveness about the winding 17 reducing its effect on the movable pointer 22 and causing it to give an indication on the scale 23 of the flow in the conduit 8.

This system of measuring flow may be operated by varying the resistance 20 each time that a reading is to be taken to bring the pointer 22 of the meter 19 to zero. Such operation has the advantage of completely counterbalancing any variations in potential of the source 14 and of always maintaining the resistance 20 at the same value as the resistance 10. Error is thus reduced to a minimum.

Figure 4:
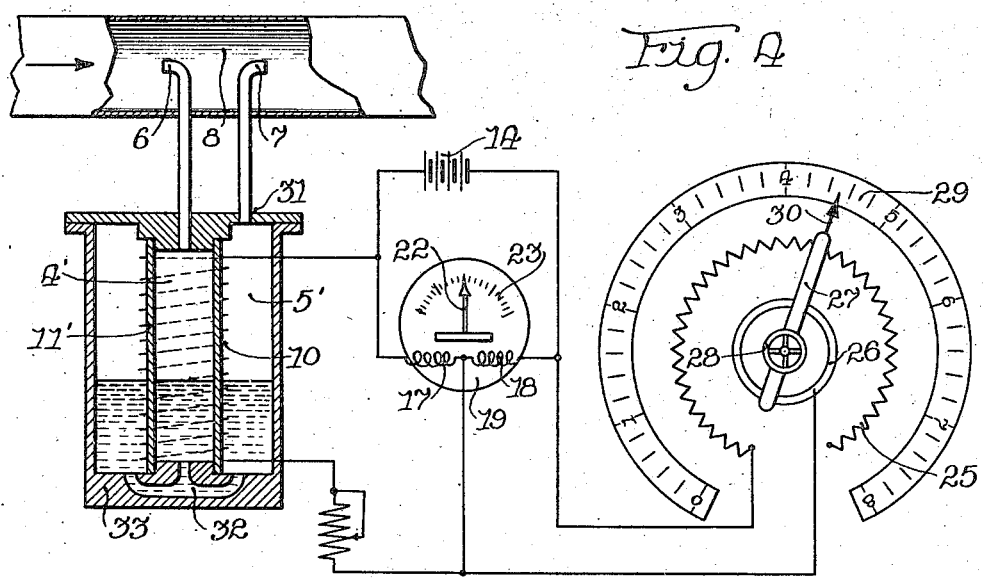
Figure 4 is a diagram of a similar layout in which the indicator is preferably brought to balance by variation of the external resistance, which external resistance has an indicator for indicating in terms of flow.

I have shown a system operating upon this theory in Figure 4.

In this system the external resistance is shown at 25 in the form of a circular rheostat having a contact ring 26 and a contact arm 27 adapted to be moved by the hand wheel 28. A suitable index or chart 29 is employed in connection with the resistance 25, a pointer 30 movable with the rheostat arm 27 indicating directly in terms of the flow of the fluid passing through the pipe or conduit 8. In operating this form of my invention the handle 28 is turned to bring the pointer 22 of the electrical indicating instrument 19 to a zero position indicating that the primary resistance 10 and the balancing or external resistance 25 are properly proportioned, and when this zero reading on the electrical instrument is secured the pointer 30 then indicates on the scale 29 the flow in the pipe 8.

In this figure I have also indicated a modified form of the pressure chamber 31. The pressure chamber 31 comprises a cylindrical container having the chambers 4' and 5' concentric with each other and communicating by way of the passages 32 in the base 33. The spool or core 11' in this case is hollow to form the inner concentric chamber 4'.

Figure 5:
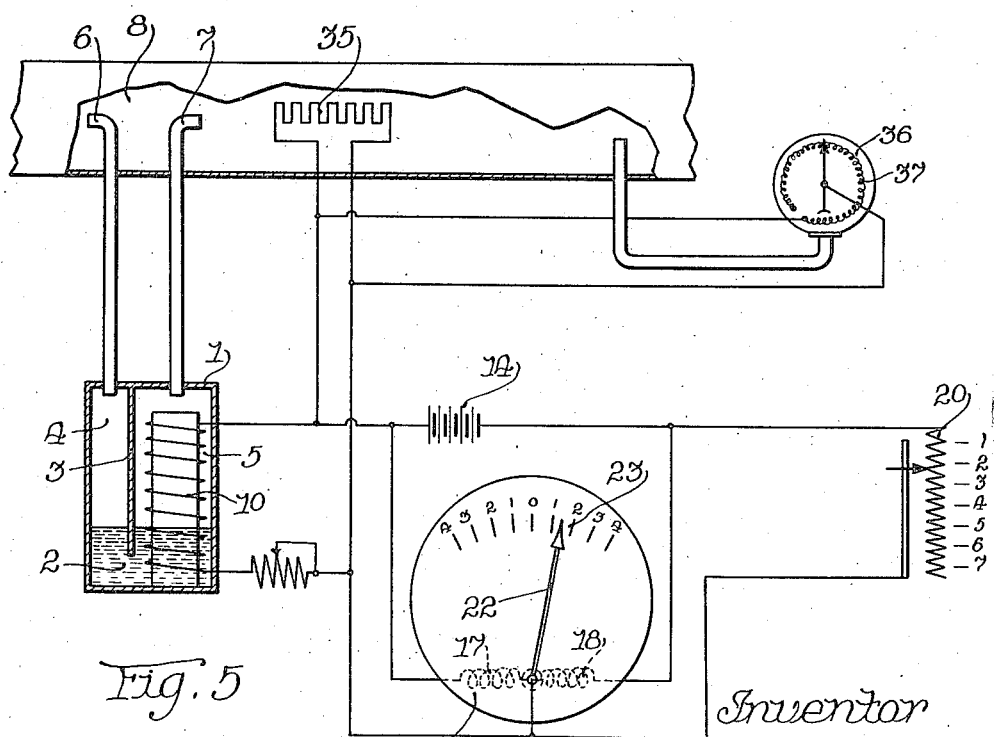
Figure 5 is a diagram of a similar system having means for taking into account the pressure and temperature of the steam or other fluid in the main pipe or conduit.

In Figure 5 I have illustrated a power meter which takes into account the factors of pressure, temperature and flow of fluid in the conduit 8. This is desirable whenever an indication substantially proportional to the mass flowing through the conduit in unit time is desired, when the material flowing is a superheated vapor. A resistance 35 subject to the temperature of the fluid in the pipe 8 is bridged across the primary resistance 10 for the purpose of modifying the effect of the same upon the galvanometer coil 17. To take into account the pressure at which the steam is delivered, the indicator 36, which is responsive to pressure, varies a resistance 37, which further modifies the effect produced on the galvanometer coil 17. The resistances 35 and 37 may be bridged across or connected in series with the resistance 10, depending upon the calibration of the instrument 19. Since the mass rate of flow through the conduit, varies directly as the velocity and pressure, and inversely with the temperature, it will be obvious that with the wiring connected as illustrated in Figure 5, the effect of a rise in temperature on resistance 35 must be the opposite of the effect of the rise in pressure on resistance 37 or a rise in velocity on resistance 10. One of the modifying resistances may also be connected across the external resistance 20 instead of the primary resistance 10, as in Figure 9. The system shown in Figure 5 is preferably operated by varying the balancing or external resistance 20 until the pointer 22 of the instrument 19 comes to zero, the average weight per unit of time of the fluid flowing in the pipe or conduit being then read directly from the valuations of the external resistance 20, which is calibrated to indicate directly.

Figure 6:
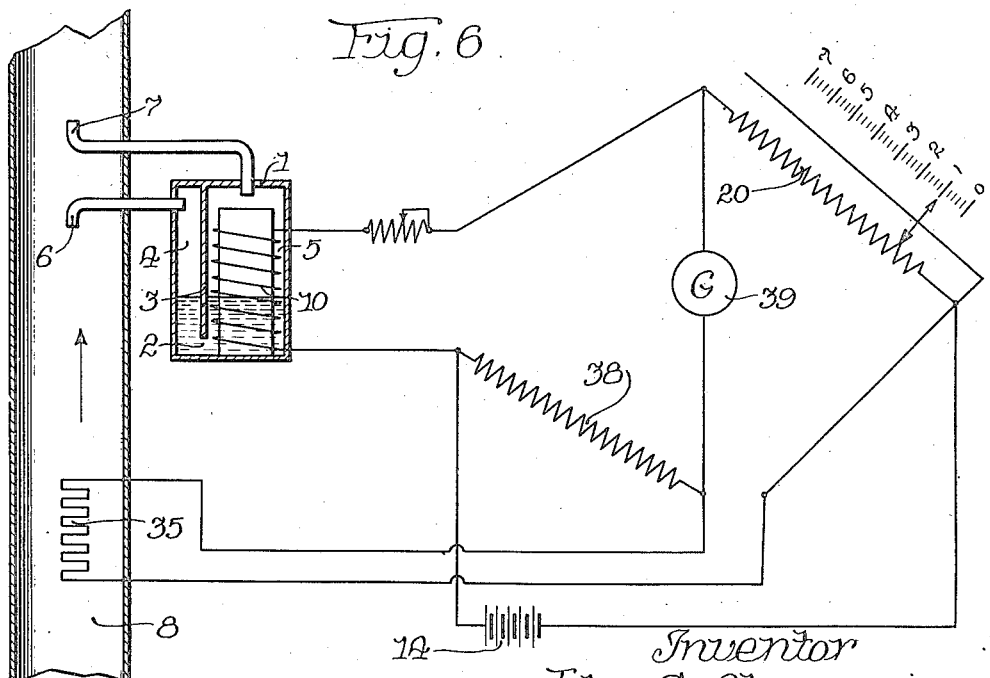
Figure 6 is a diagram of an embodiment of my invention employing the Wheatstone bridge as a method of figuring the variations of the primary resistance.

For saturated steam the temperature is a measure of the steam pressure, therefore, under these conditions, the temperature resistance can be made to perform either or both functions. In Figure 6 I have shown such an arrangement with the primary resistance 10 and the balancing or external resistance 20 connected in the arms of a Wheatstone bridge. The other arms of the bridge are composed of a resistance 38 and a resistance 35. The resistance 35, as shown in this figure, is placed in the steam pipe to take account of the temperature of the fluid in said pipe. Because the density of saturated steam increases with increase in temperature, resistance 35 is connected in an arm adjacent to balancing resistance 20, so that an increase in temperature with corresponding increase in resistance 35 will necessitate an increase in resistance 20 to maintain a balance. A galvanometer 39 is provided in the usual manner for indicating when the setting of the balancing resistance 20 is proper to balance the effect of the primary and other resistances to indicate the flow in the pipe.

In Figure 7 I have indicated an automatic power indicating system for indicating the flow of steam in the pipe 8, taking into account its temperature and pressure, in this case a balanced relay 40, having the two coils 41 and 42, being connected across the battery 43. The relay 40 has a central contact 46 which is adapted to play between the contacts 44 and 45. The stationary contacts 44 and 45 are connected to the terminals of solenoid windings 47 and 48 respectively.

The primary resistance 10 is connected in parallel with the relay winding 41 and the external balancing resistance 50 is connected in parallel across the relay winding 42. A rheostat arm 51 which is adapted to cut in or out a predetermined amount of resistance of the resistance 50, also serves as a pointer for the scale 52. The solenoids 47 and 48 have cores, 53 and 54 respectively, connected to an operating beam 55 which is geared to the shaft of the rheostat arm 51, by suitable gears 56. It can now be seen that variations in flow causing variations in resistance of the primary resistance 10 affect the winding 41 of the relay, causing it to make proper contact with the stationary contacts 44 and 45 thereby energizing the solenoid windings 47 and 48 in such manner as to move the rheostat arm 51 over the resistance 50 to balance the external resistance with the primary resistance. This action is entirely automatic and consequently is suitable to be employed in connection with a recording or graphic device, such as illustrated at 85, Figure 9, and which is well understood by those skilled in the art.

In order to make the system take into account temperature and pressure, the resistance 57 is controlled by the temperature of the steam and I arrange the resistance 58 to be controlled by the static pressure of the steam. For this purpose I provide a pressure responsive device 58' connected by a pipe 58" to the pipe 8 and adapted in an obvious manner to change the effective resistance of the coil 58, and as shown I connect the resistance 57 as a shunt to the primary resistance 10, and I connect the resistance 58 as a shunt to the balancing resistance 50, and consequently any variations in the effective resistance of these two elements modify accordingly the resultant indications.

Figure 8:
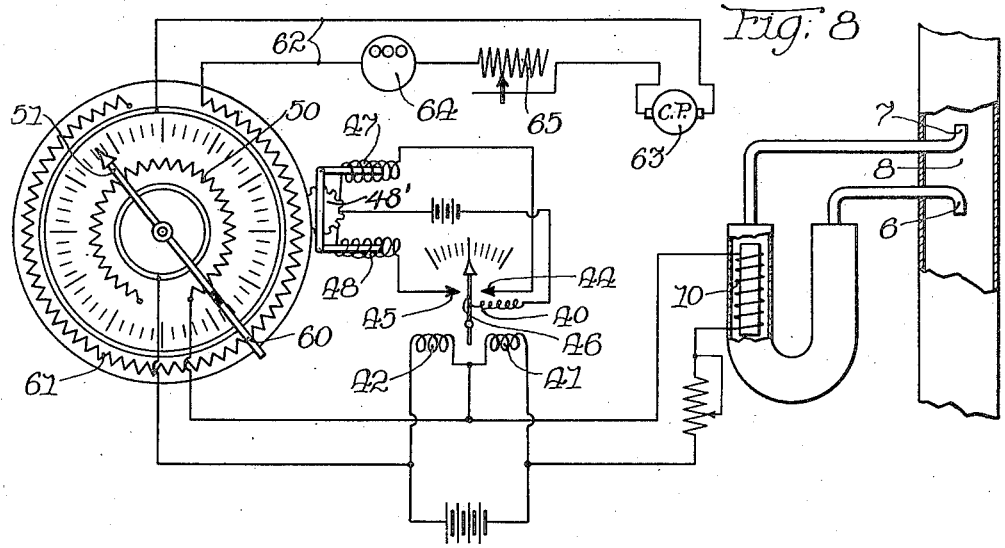
Figure 8 is a diagram of an embodiment employing electrical integrating means for integrating the flow over a given period of time.

In Figure 8 I have illustrated a system having the automatic controlling feature for controlling the operation of the rheostat arm 51 upon the balancing resistance 50. In this case the rheostat arm 51 is provided with an extension 60 which operates in connection with a suitable resistance 61 to vary the current flowing in a special circuit 62 for integrating the flow over a given period of time. The main portion of rheostat arm 51 makes contact with a slip ring 80 and with resistance 50, and the extension 60 makes contact with resistance 61 and with a slip ring 82, in a manner well understood by those skilled in the art. The circuit 62 includes a source of constant potential 63, an integrating ampere-hour meter 64 and a suitable adjusting or setting resistance 65. The variation of the primary resistance 10 throws the relay 40 out of balance and this in turn closes the circuit upon the solenoid 47 or upon the solenoid 48 as the case may be. The solenoid device in turn operates to restore the balance by revolving the indicator hand 51 thru the medium of the pinion 48' in a manner well known to those skilled in the art. It can now be seen that the variations of the flow cause variations of the setting of the pointer 51 and this in turn through the extention 60 and the resistance 61 causes changes in current flow in the integrating circuit 62 which thereupon effects an integration upon the integrating meter 64.

Figure 9:
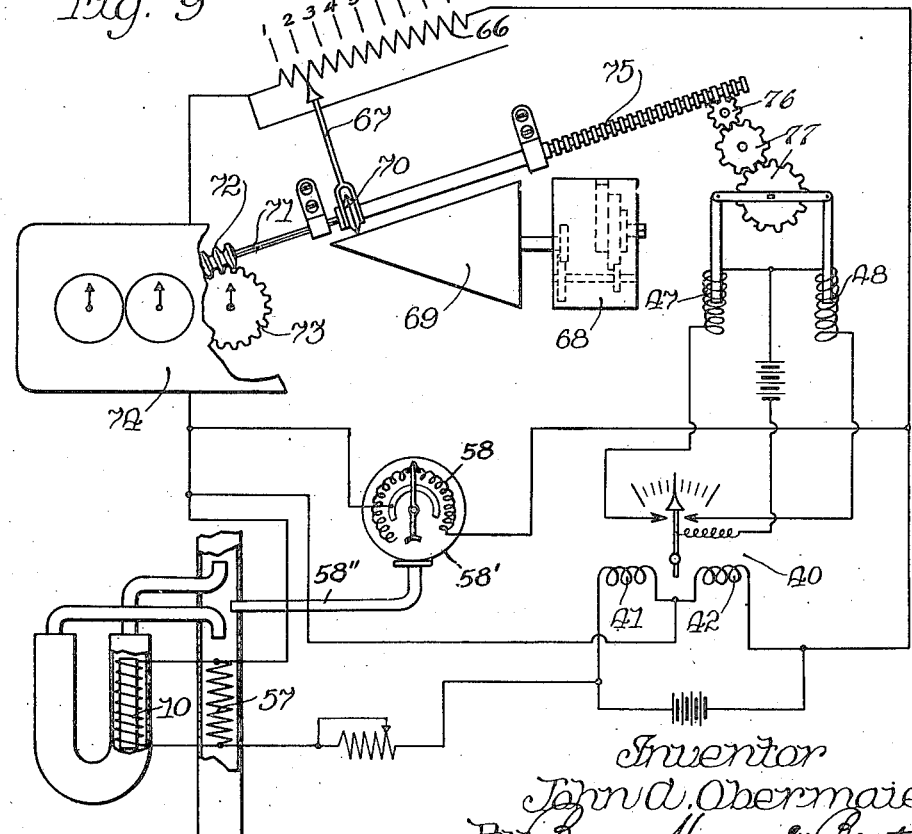
Figure 9 is a diagram of a similar system employing mechanical integrating means.

In Figure 9 I have illustrated a system employing a mechanical integrating device. A clock mechanism 68 drives a driving cone 69 which cooperates with a small friction wheel 70 upon the worm shaft 71. The worm shaft 71 drives a worm 72 which cooperates with a gear wheel 73 driving the register 74. The friction wheel 70 is controlled by a cylindrical rack 75 and pinion 76 which pinion is driven through suitable gears 77 by the solenoids 47 and 48. These solenoids control also a rheostat arm 67 which co-operates with the external or balancing resistance 66 for balancing the external resistance 66 against the primary resistance 10. The solenoids 47 and 48 are controlled by the balanced relay 40, as heretofore set out. The balanced relay 40 is adapted to indicate zero when the primary resistance 10, or rather the resistance of the circuit of which the primary resistance 10 forms a part and the adjustable resistance 66 are properly balanced. To obtain direct readings of the flow, it is obvious that a suitable scale 67' may be used in connection with the movable rheostat arm 67 which thus serves an as indicating element adapted to indicate the flow of fluid thru the conduit 8 when the electro-responsive device 40 indicates that the resistances are properly balanced.

In Figure 10 I have indicated the manner in which a graphic meter may be employed to record the flow. In this particular case a recording stylus 84 is connected to the rheostat arm 51 and is adapted to move over the recording chart or disc which is driven by time controlled mechanism as is well understood in the art.

It is obvious that a graphic device such as shown in Figure 10 may be employed in connection with any of the embodiments illustrated, or integrating means may be used as shown in Figure 8.

It is apparent that alternating current or direct current may be employed, the only change being to provide a suitable galvanometer or balanced voltmeter.

I do not intend to be limited to the details of construction shown as it is apparent to those skilled in the art, from the foregoing description and drawings that my invention may appear in various forms.

I claim:

1. In combination, a pressure container, pressure tubes connected to said container, a column of liquid in the form of a U, a primary resistance adapted to be varied by rise and fall of liquid in one leg of the column, an external resistance having means for varying the same, a source of current, an electro-responsive indicator which is adapted to give a zero reading when said resistances are properly proportioned, and a resistance varied by temperature of the fluid to be measured to affect the balance between the variable resistance and the primary resistance.

2. In combination, a conduit for fluid to be measured, a pressure container, pressure tubes connected to said container and affected by the flow of fluid in the conduit, a column of liquid in the form of a U, a primary resistance adapted to be varied by rise and fall of the liquid in one leg of the column, an external resistance having means for varying the same, a source of current, an electrical indicator which is adapted to give a zero reading when said resistances are properly proportioned, an indicating element adapted to indicate the flow of fluid in the conduit when the indicator gives zero reading and a resistance varied by the temperature of the fluid to be measured to adjust the balance between the variable resistance and the primary resistance.

3. In combination a closed pressure chamber having a column of liquid adapted to be varied by the pressure in said chamber, a Pitot tube adapted to be inserted in the fluid conduit conveying the fluid to be measured, a primary resistance adapted to be varied by variations in the height of said column, a source of current, an electrical current responsive instrument, an external resistance connected to said source of current and one side of said instrument, said primary resistance being connected to the other side of said instrument and to said source of current, means controlled by said instrument for adjusting the value of said external resistance, and means subject to the temperature of the fluid flowing in the conduit for varying the adjustment of said external resistance.

4. In a fluid meter, an electric circuit, including a source of current, a resistance element variable with changes in the rate of flow of the fluid, a second resistance element variable with changes in the static pressure of the fluid, a third resistance element variable with changes in the temperature of the fluid and a fourth variable resistance element for balancing against said other resistances to determine the combined effect of said changes on said fluid for measuring the flow of fluid through a pipe.

5. In a meter for evaluating a function dependent on three or more variables, the combination of a plurality of resistances combined in a Wheatstone bridge, means for varying one resistance in accordance with each of said variables, and means for balancing the bridge and indicating the value of said dependent function.

6. In a meter for evaluating a function dependent on three or more variables, the combination of a plurality of resistances combined in a Wheatstone bridge, means for varying one resistance in accordance with each of said variables, and means for adjusting one resistance to balance the bridge and express the evaluated result.

7. In combination, a Wheatstone bridge having fixed resistances in two arms, and two variable resistances in parallel in each of the other arms, three of the variable resistances being controlled as functions of physical phenomena, and the fourth being automatically adjustable to balance the bridge, whereby said adjustment indicates the combined evaluation of all three sets of physical phenomena.

8. In a fluid meter, an electric circuit including a source of current, a resistance element variable with changes in the rate of flow of the fluid to be measured, a second resistance element, static pressure controlled means, means actuated by said pressure controlled means for varying said second resistance in accordance with variations in density of the fluid, a third resistance element variable with changes in the temperature of the fluid and a fourth variable resistance element for balancing against said other resistance to determine the combined effect of said variations in the qualities of the fluid for measuring the flow of said fluid.

9. In combination, more than two resistances, means for varying each of said resistances as a function of a physical phenomenon, a Wheatstone bridge containing said resistances, and means for obtaining the value of a combined mathematical function of said resistances by balancing said bridge, whereby the operating potential supplied to the system, and the current values in the system, have no effect on the measurements.

10. In combination, three variable resistances, a Wheatstone bridge containing said resistances, and automatic means actuated by the cross connection of said bridge for adjusting another of the bridge resistances to balance the bridge and indicate a combined mathematical function of said three resistances.

In witness whereof I hereunto subscribe my name this 28th day of December, A. D. 1917.

JOHN A. OBERMAIER.